Patented Nov. 24, 1925.

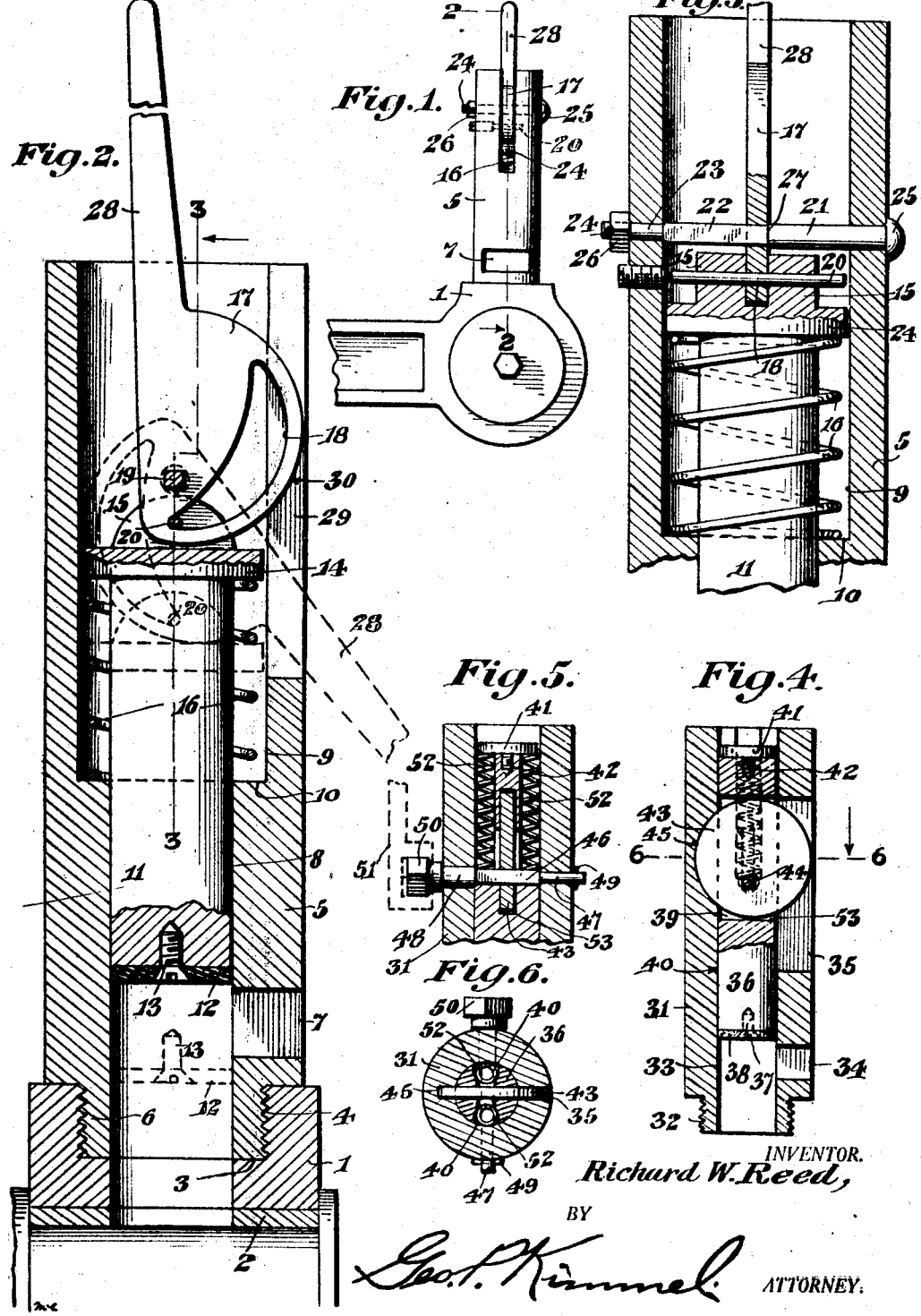

1,563,226

UNITED STATES PATENT OFFICE.

RICHARD W. REED, OF WASHINGTON, DISTRICT OF COLUMBIA.

PORTABLE LUBRICANT OR GREASE CUP FILLER.

Application filed April 26, 1924. Serial No. 709,279.

*To all whom it may concern:*

Be it known that I, RICHARD W. REED, a citizen of the United States, residing at Washington, in the District of Columbia, have invented certain new and useful Improvements in Portable Lubricant or Grease Cup Fillers, of which the following is a specification.

This invention relates to a portable lubricant or grease cup filler, designed primarily for filling the lubricant or grease cups employed in connection with the bearings between the connecting rods and crank pins of locomotives for which a relative large body of lubricant or grease is necessary, but it is to be understood that a filling device in accordance with this invention can be employed for any purpose for which it is found applicable, and the invention has for its object to provide, in a manner as hereinafter set forth, a filling device having means for detachably connecting it with the cup and adapted to contain a body of lubricant or grease and further having means whereby such body can be quickly forced into the cup to fill the same for lubricating purposes, after which the device is disconnected from the cup and the latter is then closed.

Further objects of the invention are to provide, in a manner as hereinafter set forth, a portable lubricant or grease cup filler, which is simple in its construction and arrangement, strong, durable, compact, thoroughly efficient and convenient in its use, readily assembled and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1 is a side elevation of a bearing showing the adaptation therewith of a filler in accordance with this invention.

Figure 2 is a section on line 2—2, Figure 1, upon an enlarged scale and further illustrating in full lines the device in retracted position and in dotted lines in advanced position.

Figure 3 is a fragmentary view taken on the line 3—3 of Figure 2.

Figure 4 is a vertical sectional view, upon a reduced scale of a modified form of filler.

Figure 5 is a fragmentary view, in vertical section, of the form shown in Figure 4 and taken at right angles thereto.

Figure 6 is a section on line 6—6, Figure 4.

Referring to the drawings in detail, 1 indicates conventionally a lubricant or grease cup arranged in operative relation with respect to a bearing 2. The cup 1 is shouldered on its inner face, as at 3, and also interiorly threaded, as at 4. Although not shown, the cup 1 is to be closed by a removable plug or cap which threadedly engages with the threads 4. When the lubricant or grease is to be supplied, the cap is removed and the filler detachably engages with the threads 4. As the cap forms no part of this invention, it is thought unnecessary to show the same.

Referring to Figures 1 to 3, the portable lubricant or grease cup filler, in accordance with this invention, comprises a tubular body portion 5, having a reduced peripherally threaded inner terminal portion 6 for threadedly engaging with the cap 1, whereby the filler will be detachably connected in position for the purpose of supplying lubricant or grease.

The tubular body portion 5, in close proximity to the reduced inner terminal portion 6, is formed with a laterally extending rectangular opening 7, which is employed for the purpose of inserting the body of lubricant or grease into the body portion 5, so that the body of lubricant or grease can be forced into the cup 1.

The tubular body portion 5 is set up of two different inner diameters, that portion of smaller inner diameter indicated at 8, and the portion of larger diameter at 9. The providing of the tubular body portion 5 of two different inner diameters forms a shoulder 10 at the outer terminus of that portion 8 of smaller diameter. The opening 7 communicates with the portion 8 of smaller diameter.

Snugly engaging the wall of the portion 8 of smaller diameter is a plunger 11 of a length to extend into the portion 9 of larger diameter. Secured to the inner end of the plunger 11 is a washer element 12 of any suitable material, and said element 12 rides against the inner face of the body portion 5 at the part of smaller inner diameter thereof. The washer 12 is secured in position by a hold-fast device 13. The outer end of the plunger 11 is provided with a laterally extending annular flange or head 14, of materially greater diameter than the diameter of the portion 8, but slightly less in diameter than the diameter of the portion 9.

The head 14 of the plunger 11 is formed with a pair of outwardly extending spaced semi-circular lugs 15, and surrounding the plunger 11 and interposed between the head 14 and shoulder 10 is a coiled spring 16 which normally maintains the plunger 11 in a retracted position.

The plunger 11 is shifted for the purpose of forcing the body of lubricant or grease from the body portion 5 through the medium of a manually operated cam pivotally supported from the body portion 5 and slidably connected to the lugs 15. The cam is indicated at 17, is substantially semi-circular in contour and formed with a segmental-shaped slot 18. The cam 17 is provided with a polygonal-shaped opening 19 disposed eccentrically with respect thereto. The cam 17 extends between the lugs 15 and is slidably connected therewith by a pin 20, which is mounted in the lugs 15 and extends through the slot 18.

Journalled in the tubular body portion 5 is a pivot for the cam 17, and said pivot consists of a substantially elongated bar provided with an elongated cylindrical portion 21, a polygonal-shaped portion 22, a cylindrical portion 23 and a threaded portion 24. The cylindrical portion 21 has its outer end provided with a head 25, which abuts against the periphery of the tubular body portion 5. The peripherally threaded portion 24 carries a nut 26 which abuts against the periphery of the tubular body portion 5 and in connection with the head 25 secures the pivot, for the cam 17, to the tubular body portion 5. The portions 21 and 23 are journalled in the tubular body portion 5, and the polygonal portion 22 extends through the polygonal opening 19 so that when the cam 17 is shifted the pivot will be carried therewith. The polygonal portion 22 terminates in the cylindrical portion 23 and in connection with the latter provides a shoulder 27, against which abuts the cam 17.

Formed integral with the cam 17 and projecting outwardly therefrom, is a lever arm 28 which facilitates the manual operation of the cam 17 for the purpose of shifting the plunger 11 to expel the lubricant or grease from the tubular body portion 5. To provide a clearance for the cam 17 and lever 28, the tubular body portion 5 is formed with a lengthwise extending slot 29 of substantial length. When the lever arm 28 is shifted in a clockwise direction, the curved edge 30 of the cam 17 will ride against the outer face of the head 14, (see dotted lines in Figure 2) whereby the plunger 11 will be moved inwardly to expel lubricant or grease. When pressure is released on the lever 28, the action of the spring 16 will shift the plunger 11 to retracted position.

In the form shown in Figures 4 to 6, the tubular body portion is indicated at 31 and is formed with a reduced peripherally threaded inner terminal portion 32 for the purpose of detachably connecting the body portion 31 with the cup 1. The bore 33 of the body portion 31 is of the same diameter throughout. The body portion 31, in proximity to its reduced inner terminal 32, is formed with a rectangular opening 34 for the purpose of positioning the body of lubricant or grease in the bore 33. The body portion 31 is furthermore provided with a substantially elongated slot 35, positioned outwardly with respect to the opening 34, and the latter and the slot 35 communicate with the bore 33.

Operating in the bore 33 is a plunger 36, which is normally in a retracted position. The plunger 36 is cylindrical, snugly engages the wall of the bore 33 and has secured to its inner end, by the hold-fast device 37, a washer 38 of any suitable material.

The plunger 36, intermediate its ends, is formed with a lengthwise extending slot 39, and said plunger 36, at right angles to the slot 39, has its periphery formed with lengthwise extending grooves 40, projecting to the outer end of the plunger 36 and said grooves 40 have their outer ends closed by a disk 41, secured to the plunger 36, as at 42.

The plunger 36 is shifted from retracted position through the medium of a rotative cam 43 of circular contour and the said cam 43 is formed with an eccentrically disposed polygonal opening 44. The diameter of the cam 43 is materially greater than the diameter of the bore 33, and said cam 43 extends into the slot 35, the latter providing a clearance therefor. The inner face of the body portion 31 is grooved, as at 45, which also provides a clearance for the cam 43. See Figure 4.

The cam 43 is actuated through the medium of a rotative spindle or shaft formed of a polygonal-shaped intermediate portion 46 and a pair of cylindrical end portions 47, 48, which are journalled in the body portion 31. The intermediate portion 46 extends through the polygonal-shaped opening 44 in the disk 43, so that when the spindle or shaft is revolved, the cam 43 will be carried therewith. The end portion 47 projects from the body portion 31 and is provided with a cotter pin 49. The end portion 48 projects from the body portion 31 and carries a cap piece 50 of polygonal contour, and said cap piece 50, in connection with the cotter pin 49, connects the spindle or shaft to the body portion 31. The polygonal cap piece 50, if desired, can have detachably mounted thereon, a suitable instrument 51 for the purpose of rotating the spindle or shaft.

The plunger 36 is normally retained in retracted position through the medium of a pair of coiled springs 52, which are mounted in the grooves 40 and are interposed between the disk 41 and the polygonal-shaped portion 46 of the spindle.

The cam 43 is revolved to shift the plunger 36 inwardly to expel lubricant or grease against the action of the springs 52, and when the cam 43 is operated it rides against the end wall 53 of the slot 39, and owing to the fact that the cam 43 is eccentrically mounted, it is obvious that the plunger 36 will be shifted inwardly from its retracted position. When the spindle is released, the action of the springs 52 will force the plunger to its normal position.

The normal position of the plungers 11 and 36 is outwardly with respect to the openings 7 and 34 respectively, so that the plungers will not interfere with the positioning of the body of lubricant or grease within the body portion of the device, or in the path of the plunger so that when the plungers are manually shifted the lubricant or grease will be forced into the cup 1.

It is thought that the many advantages of a filling device, in accordance with this invention and for the purpose set forth, can be readily understood, and although the preferred embodiment of the invention is as illustrated and described, yet it is to be understood that changes in the details of construction can be had which will fall within the light of the invention as claimed.

What I claim is:—

A portable lubricant or grease cup filler comprising a tubular body portion adapted to contain a body of lubricant or grease, a normally retracted spring controlled lubricant expelling plunger permanently arranged completely within said body portion intermediate the ends of the latter, a rotatable support extending through and journalled in said body portion, and a manually operated plunger shifting device connected eccentrically thereof to said means and having edge engagement with said plunger for shifting it to expel the lubricant, said body portion provided at one side with a lengthwise extending slot to constitute a clearance for said device.

In testimony whereof, I affix my signature hereto.

RICHARD W. REED.